US007701178B2

(12) United States Patent
Tsukamoto et al.

(10) Patent No.: US 7,701,178 B2
(45) Date of Patent: Apr. 20, 2010

(54) CHARGE CONTROL THAT KEEPS CONSTANT INPUT VOLTAGE SUPPLIED TO BATTERY PACK

(75) Inventors: Masaya Tsukamoto, Kasugai (JP); Akira Haraguchi, Kasugai (JP); Hidekiyo Ozawa, Kasugai (JP)

(73) Assignee: Fujitsu Microelectronics Limited, Yokohama (JP)

( * ) Notice: Subject to any disclaimer, the term of this patent is extended or adjusted under 35 U.S.C. 154(b) by 0 days.

(21) Appl. No.: 10/954,754

(22) Filed: Oct. 1, 2004

(65) Prior Publication Data

US 2005/0275379 A1 Dec. 15, 2005

(30) Foreign Application Priority Data

Jun. 14, 2004 (JP) ............................ 2004-175721

(51) Int. Cl.
*H02J 7/06* (2006.01)
*H02J 7/00* (2006.01)

(52) U.S. Cl. ........................ 320/164; 320/132; 320/159

(58) Field of Classification Search ................ 320/134, 320/136, 132, 159, 164; 323/303
See application file for complete search history.

(56) References Cited

U.S. PATENT DOCUMENTS

| | | | | |
|---|---|---|---|---|
| 5,703,470 | A * | 12/1997 | Baranowski et al. | 320/152 |
| 6,040,684 | A * | 3/2000 | Mitchell | 320/139 |
| 6,075,343 | A * | 6/2000 | Hsu | 320/134 |
| 6,198,255 | B1 * | 3/2001 | Yoshida | 320/134 |
| 6,329,796 | B1 * | 12/2001 | Popescu | 320/134 |
| 6,396,246 | B2 * | 5/2002 | Haraguchi et al. | 320/134 |
| 6,861,824 | B1 * | 3/2005 | Liu et al. | 320/164 |
| 6,903,533 | B1 * | 6/2005 | Geren et al. | 320/134 |

FOREIGN PATENT DOCUMENTS

JP 2002-10509 1/2002

* cited by examiner

*Primary Examiner*—Edward Tso
*Assistant Examiner*—Richard V Muralidar
(74) *Attorney, Agent, or Firm*—Arent Fox LLP

(57) ABSTRACT

A circuit for controlling charging includes a transistor provided on a charging path between a position of a charging terminal and a position of a battery, an input voltage detecting circuit configured to detect a potential of a point on the charging path coupled to the charging terminal's side of the transistor, and a drive circuit configured to control an ON resistance of the transistor between a conductive state and a nonconductive state in response to the potential detected by the input voltage detecting circuit.

18 Claims, 8 Drawing Sheets

AC100V
10
AC ADAPTOR
16V
11
CHARGER
12.6V
14
12
DC-DC CONVERTER
0.9V
2.5V
3.3V
5.0V
13 BATTERY PACK
V+
V-
21
22
23
OVERCHARGE AND OVER-DISCHARGE DETECTING CIRCUIT
24
OVER-DISCHARGE DETECTION SIGNAL
OVERCHARGE DETECTION SIGNAL 24
34
21
R0
37
DRIVE CIRCUIT
32
33
35
36
R1
R2
VA
INPUT VOLTAGE DETECTING CIRCUIT
31
V+
OVERCHARGE DETECTION SIGNAL

STANDBY SIGNAL
24
40
21
34
R0
37
DRIVE CIRCUIT
32
33
35
36
R1
R2
VA
INPUT VOLTAGE DETECTING CIRCUIT
31
V+
OVERCHARGE DETECTION SIGNAL

24
VB
Rs
52
CURRENT
DETECTOR
51
50
33
21
37
34
38
DRIVE
CIRCUIT
R0
32A
35
36
R1
R2
INPUT VOLTAGE
DETECTING CIRCUIT
31A
OVERCHARGE
DETECTION SIGNAL
V+

24
IRS
Rs
VB
34
21
R0
CURRENT MONITORING CIRCUIT
69
63
DRIVE CIRCUIT
37
32
33
OVERCHARGE DETECTION SIGNAL
64
65
VC
VTH2
Q4
Q6
V2
R8
Q3
V1
R10
R7
Q2
R9
68
Q1
Q5
MULTIPLICATION CIRCUIT
62
R4
67
R3
R6
R5
DIFFERENTIAL AMPLIFICATION CIRCUIT
61
GATE CONTROL OPERATION UNIT
35
36
R1
R2
V+
INPUT VOLTAGE DETECTING CIRCUIT
31A

24
R12
34
21
72
71
R0
40
R11
37
DRIVE CIRCUIT
32
33
35
36
R1
R2
INPUT VOLTAGE DETECTING CIRCUIT
31
V+
OVERCHARGE DETECTION SIGNAL
STANDBY SIGNAL

CHARGE CONTROL THAT KEEPS CONSTANT INPUT VOLTAGE SUPPLIED TO BATTERY PACK

CROSS-REFERENCE TO RELATED APPLICATIONS

The present application is based upon and claims the benefit of priority from the prior Japanese Patent Application No. 2004-175721 filed on Jun. 14, 2004,with the Japanese Patent Office, the entire contents of which are incorporated herein by reference.

BACKGROUND OF THE INVENTION

1.Field of the Invention

The present invention generally relates to charging circuits used in battery packs for electronic apparatus, and also relates to such battery packs and electronic apparatus. The present invention particularly relates to a charge control circuit for controlling the charging of a battery in the battery pack of electronic apparatus, and also relates to such a battery pack and electronic apparatus.

2.Description of the Related Art

In portable apparatus such as notebook-type personal computers or the like, an internal power supply circuit for supplying electric power to core electronic circuitry is required to be small. The internal power supply circuit is also required to be operable with high efficiency in order to achieve a long battery-powered operating time.

Notebook personal computers use a battery pack or an AC adapter receiving power from a commercial power supply as the source of electric power. A predetermined voltage (e.g., 16 V) supplied from this source of electric power is converted to other voltage levels by an internal power supply circuit, thereby supplying internal voltages needed by respective core electronic circuits. For example, CPU uses a voltage level of 0.9 V or 1.5 V, a hard-disc drive and CD-ROM drive using 5 V, an LSI using 3.3 V, and a memory using 2.5 V. In order to charge the battery pack, the 16-V voltage level output from the AC adapter is lowered to 12.6 V by a charger, and this lowered voltage is supplied to the battery pack such as a lithium-ion battery pack. When the commercial power supply is not used, the battery pack charged in this manner is used to supply electric power to the internal power supply circuit.

As the circuit density of semiconductor integrated circuits increases, with resultant improvement in functionality and performance, the operating voltage of semiconductor integrated circuits is increasingly lowered. With such lowering of an operating voltage, an internal power supply circuit provided inside notebook personal computers or the like needs to make a significant voltage reduction to a predetermined voltage supplied from an AC adaptor in order to produce a stepped-down voltage that is to be supplied to core electronic circuitry.

A DC-DC converter serving as the internal power supply circuit, however, has a problem in that efficiency drops as a difference between the input voltage and the output voltage widens. An on/off ratio of the output transistor of a DC-DC converter is determined according to a ratio of the output voltage to the input voltage. As a difference between the input voltage and the output voltage widens, therefore, the "on" period of the output transistor becomes extremely short. As a result, the time length of a rise and a fall of the output transistor ends up having a significant proportion relative to the time length of the "on" period, resulting in voltage conversion efficiency deteriorating. When the "on" period of the output transistor becomes extremely short, also, it becomes difficult to increase the frequency of a DC-DC converter. Because of this, there is no choice but to use the DC-DC converter at low operating frequency, which ends up requiring a bulky coil. This is not preferable when considering the miniaturization of a DC-DC converter.

The above-stated problems are obviated if a difference between the input voltage and output voltage of a DC-DC converter is reduced. The output of an AC adaptor, which also serves as the source of electric power, cannot be lowered below a predetermined level (e.g., 16 V) because this output is also used to drive the display of the notebook personal computer. Against this background, proposals have been made to utilize a voltage level of 12.6 V output from the charger as described above as an input to a DC-DC converter.

FIG. 1 is a block diagram showing an example of the construction of a system supplying the output of a charger to a DC-DC converter. In FIG. 1, an AC adapter 10 receives an alternating voltage (e.g., 100.V) from a commercial power supply or the like, and generates a direct-current voltage (e.g., 16 V) for provision to a charger 11. The charger 11 generates a predetermined voltage (12.6 V) from the voltage supplied from the AC adapter 10. The generated voltage is supplied as a charge voltage V+ to a battery pack 13 through a current detecting resistor 14, which provides charging to be performed with a constant current. The predetermined voltage (12.6 V) output from the charger 11 is also supplied to a DC-DC converter 12 where it is converted to other voltage levels. Then, the stepped-down voltages (e.g., 0.9 V, 2.5 V, 3.3 V, 5.0 V) are supplied to respective internal electronic circuits.

The battery pack 13 includes a PMOS transistor 21, a PMOS transistor 22, an overcharge and over-discharge detecting circuit 23, and a lithium-ion battery 24. In this example, the lithium-ion battery 24 has a construction in which three batteries are connected in series. The overcharge and over-discharge detecting circuit 23 measures the voltage level of the lithium-ion battery 24 to detect whether it is in an overcharged state or in an over-discharged state. Upon detecting an overcharged stage, the overcharge and over-discharge detecting circuit 23 provides a HIGH overcharge detection signal to the gate of the PMOS transistor 21. In response, the PMOS transistor 21 becomes nonconductive, thereby preventing further charging. If an over-discharged state is detected, the overcharge and over-discharge detecting circuit 23 provides a HIGH over-discharge detection signal to the gate of the PMOS transistor 22. In response, the PMOS transistor 22 becomes nonconductive, thereby preventing further discharging.

In the construction of FIG. 1, the input voltage supplied to the DC-DC converter 12 is not the output voltage (e.g., 16 V) of the AC adapter 10 but the stepped-down voltage (e.g., 12.6 V) lowered by the charger 11. Since a difference between the output voltage and input voltage of the DC-DC converter 12 is not so large, advantage is gained in terms of voltage conversion efficiency and circuit size.

[Patent Document 1] Japanese Patent Application Publication No. 2002-10509

In the construction of FIG. 1, the input voltage of the DC-DC converter 12 is clamped to the input voltage V+ of the battery pack 13. When the input voltage V+ of the battery pack 13 drops in an over-discharged state, the input voltage of the DC-DC converter 12 also drops. If the voltage V+ falls below 5 V in the over-discharged stage, the DC-DC converter 12 cannot supply an output voltage of 5 V to the core electronic circuitry.

Moreover, since the charger 11 is a DC-DC converter operating based on constant-current and constant-voltage control, its output voltage fluctuate (drops) if the electric-current load exceeds a specified level. If the load of the DC-DC converter 12 increases while the battery pack 13 is charged, the voltage V+ equal to the output of the charger 11 fluctuates (drops). This may cause a failure with respect to the operation of the DC-DC converter 12 and the charging of the battery pack 13.

Accordingly, there is a need for a charge control circuit that controls a charging process such as to keep constant the input voltage V+ of a battery pack of electronic apparatus. There is also a need for such a battery pack and electronic apparatus.

SUMMARY OF THE INVENTION

It is a general object of the present invention to provide a charge control circuit, a battery pack, and an electronic apparatus that substantially obviate one or more problems and drawbacks caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a charge control circuit, a battery pack, and an electronic apparatus particularly pointed out in the specification in such full, clear, concise, and exact terms as to enable a person having ordinary skill in the art to practice the invention.

To achieve these and other advantages in accordance with the purpose of the invention, the invention provides a circuit for controlling charging, which includes a transistor provided on a charging path between a position of a charging terminal and a position of a battery, an input voltage detecting circuit configured to detect a potential of a point on the charging path coupled to the charging terminal's side of the transistor, and a drive circuit configured to control an ON resistance of the transistor between a conductive state and a nonconductive state in response to the potential detected by the input voltage detecting circuit.

According to another aspect of the invention, a battery pack includes a charge control circuit and a battery configured to be charged through a charging path, wherein the charge control circuit includes a transistor provided on the charging path between a position of a charging terminal and a position of the battery, an input voltage detecting circuit configured to detect a potential of a point on the charging path coupled to the charging terminal's side of the transistor, and a drive circuit configured to control an ON resistance of the transistor between a conductive state and a nonconductive state in response to the potential detected by the input voltage detecting circuit.

According to another aspect of the invention, an electronic apparatus includes a battery pack including a charge control circuit and a battery configured to be charged through a charging path, a charger having an input terminal receiving a direct-current voltage and an output terminal coupled to the battery pack, and configured step down the direct-current voltage received at the input terminal for output to the output terminal, a DC-DC converter coupled to the output terminal of the charger, and an electronic circuit coupled to an output of the DC-DC converter, wherein the charge control circuit includes a transistor provided on the charging path between a position of a charging terminal and a position of the battery, an input voltage detecting circuit configured to detect a potential of a point on the charging path coupled to the charging terminal's side of the transistor, and a drive circuit configured to control an ON resistance of the transistor between a conductive state and a nonconductive state in response to the potential detected by the input voltage detecting circuit.

According to at least one embodiment of the invention, the ON resistance of the transistor is controlled in response to the input voltage supplied to the charging terminal in such manner that the ON resistance takes any value between a fully conductive state and a fully non-conductive state. In the related-art construction, the control of a transistor uses only two states, i.e., an "on" state or an "off" state. In at least one embodiment of the invention, the control of the transistor is performed continuously between the "on" state and the "off" state. This makes it possible to achieve feedback control that stabilizes the input voltage at a predetermined voltage level.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments of the present invention will be described with reference to the accompanying drawings.

Figure 1:
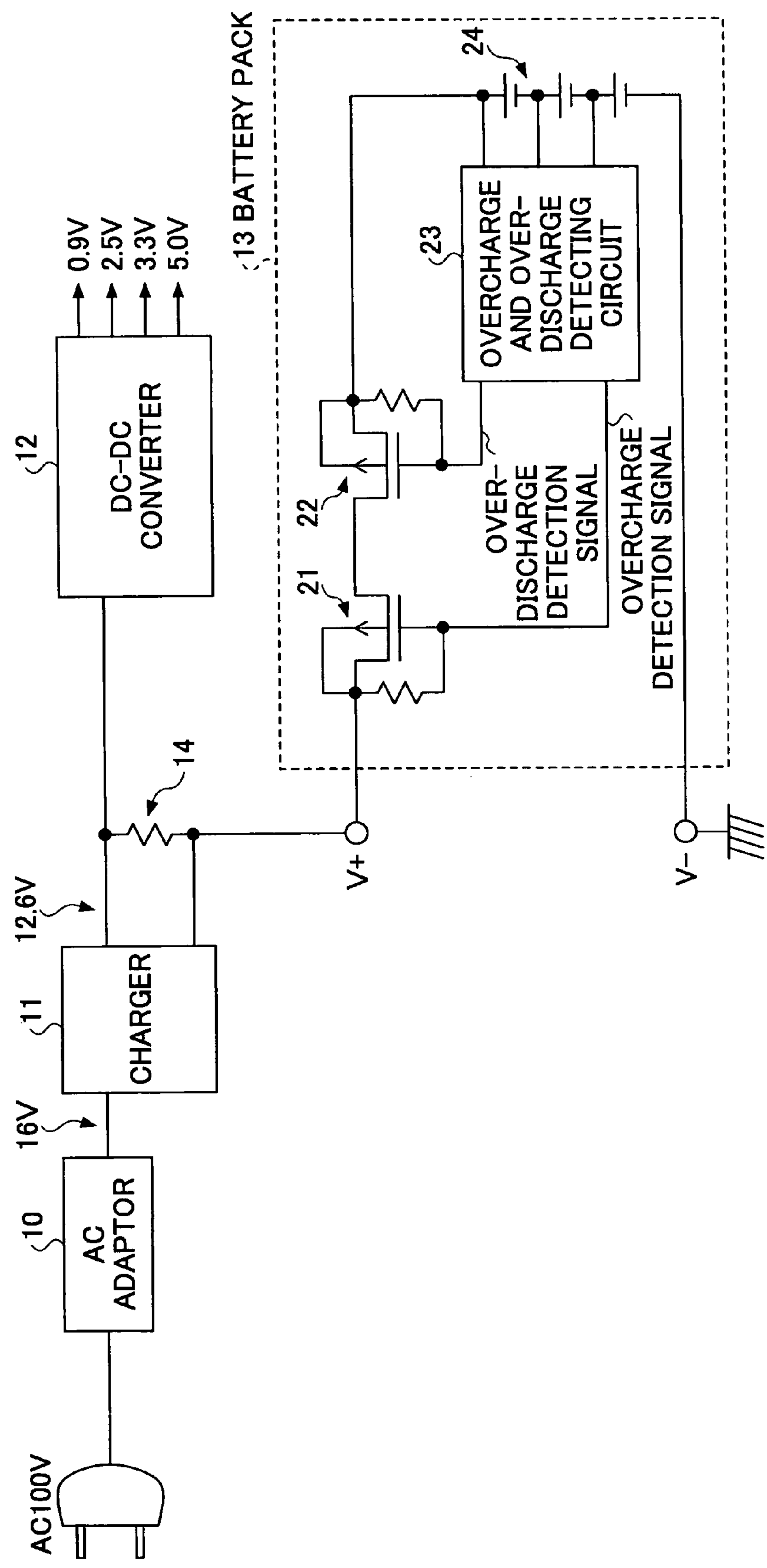
FIG. 1 is a block diagram showing an example of the construction of a system supplying the output of a charger to a DC-DC converter.
Figure 2:
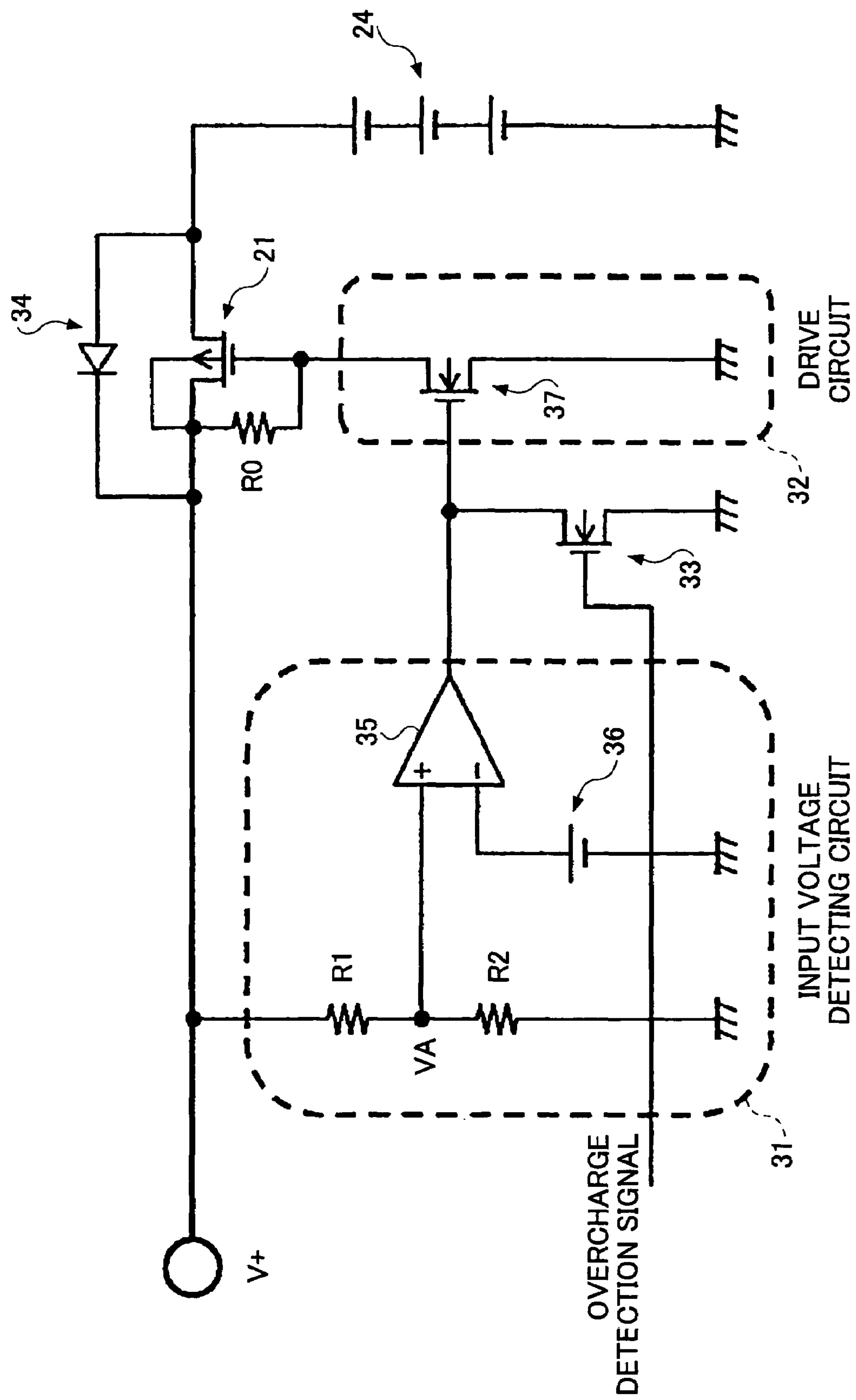
FIG. 2 is a circuit diagram showing the construction of a first embodiment of a charge control circuit according to the present invention.

FIG. 2 is a circuit diagram showing the construction of a first embodiment of a charge control circuit according to the present invention. The charge control circuit of FIG. 2 includes an input voltage detecting circuit 31 and a drive circuit 32 as main elements, and is provided in the battery pack 13 shown in FIG. 1.

The input voltage detecting circuit 31 includes resistors R1 and R2, an amplifier 35, and a reference-voltage source 36. The drive circuit 32 includes an NMOS transistor 37. In the input voltage detecting circuit 31, the input voltage V+ of the battery pack 13 is divided by the resistors R1 and R2, and a divided potential VA is supplied to the non-inverted input terminal of the amplifier 35. The inverted input terminal of the amplifier 35 receives a reference potential from the reference-voltage source 36. The amplifier 35 generates an output responsive to a difference between the divided potential VA and the reference potential for provision to the gate node of the NMOS transistor 37 of the drive circuit 32. The drain node of the NMOS transistor 37 is connected to the gate node of the PMOS transistor 21.

With this provision, a potential at the gate node of the PMOS transistor 21 is controlled according to the level of the input voltage V+. As the input voltage V+ increases, the output potential of the amplifier 35 rises, resulting in a drop in the gate potential of the PMOS transistor 21. This reduces the ON resistance of the PMOS transistor 21. Since the charger 11 (see FIG. 1) performs constant-current charging by use of the current detecting resistor 14, a drop in the ON resistance of the PMOS transistor 21 causes a drop in the input voltage V+. In this manner, the input voltage V+ is controlled to drop in response to an increase in the input voltage V+, thereby settling at a predetermined voltage.

Conversely, a drop in the input voltage V+ results in a drop in the output potential of the amplifier 35, thereby raising the gate potential of the PMOS transistor 21. This increases the ON resistance of the PMOS transistor 21. Since the charger 11 (see FIG. 1) performs constant-current charging by use of the current detecting resistor 14, an increase in the ON resistance of the PMOS transistor 21 causes a rise in the input voltage V+. In this manner, the input voltage V+ is controlled to rise in response to a drop in the input voltage V+, thereby settling at a predetermined voltage.

In this manner, the present invention controls the ON resistance of the PMOS transistor 21 in response to the input voltage V+ such that the ON resistance takes any value between a fully conductive state and a fully non-conductive state. In the related-art construction shown in FIG. 1, the control of the PMOS transistor 21 uses only two states, i.e., an "on" state or an "off" state. In the present invention, the control of the PMOS transistor 21 is performed continuously between the "on" state and the "off" state. This makes it possible to achieve feedback control that stabilizes the input voltage V+ at a predetermined voltage level.

At the time of overcharging, the overcharge detecting signal changes to HIGH, making the NMOS transistor 33 conductive. This makes the NMOS transistor 37 of the drive circuit 32 nonconductive, so that the gate of the PMOS transistor 21 coupled to the input voltage V+ through a resistor R0 changes to HIGH. As a result, the PMOS transistor 21 becomes nonconductive, suspending charging. Although the PMOS transistor 21 for charge control is nonconductive at the time of overcharging, a parasitic diode 34 permits discharging.

Figure 3:
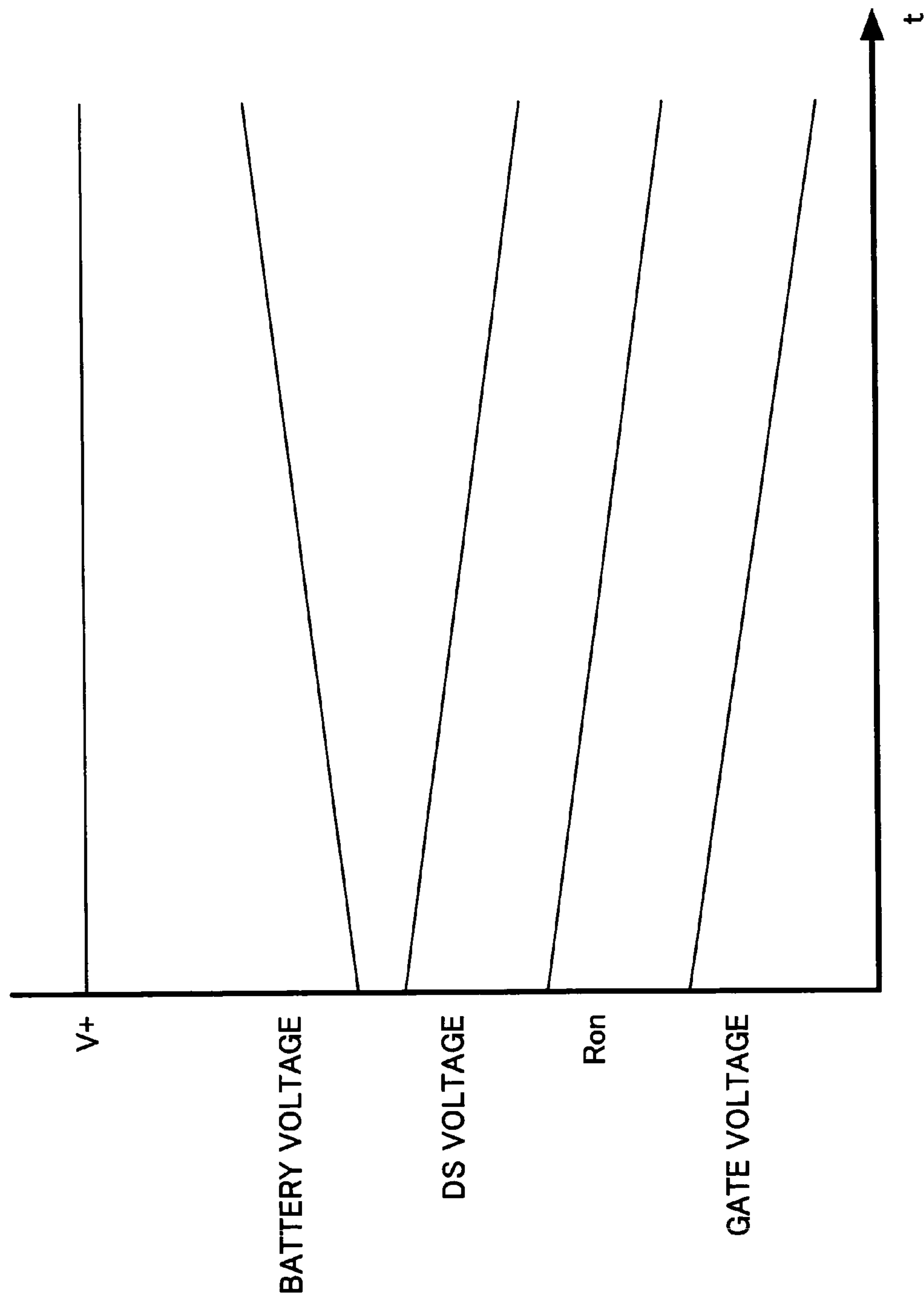
FIG. 3 is a diagram for explaining the charging operation of the charge control circuit shown in FIG. 2.

FIG. 3 is a diagram for explaining the charging operation of the charge control circuit shown in FIG. 2. In FIG. 3, the horizontal axis represents time t. As a charging operation continues, the battery voltage of the lithium-ion battery 24 gradually goes up. To cancel such a voltage rise, a charge control operation by the input voltage detecting circuit 31 and the drive circuit 32 lowers the gate voltage and ON resistance Ron of the PMOS transistor 21. With this, the DS voltage that is a voltage between the drain and source of the PMOS transistor 21 gradually drops.

Figure 4:
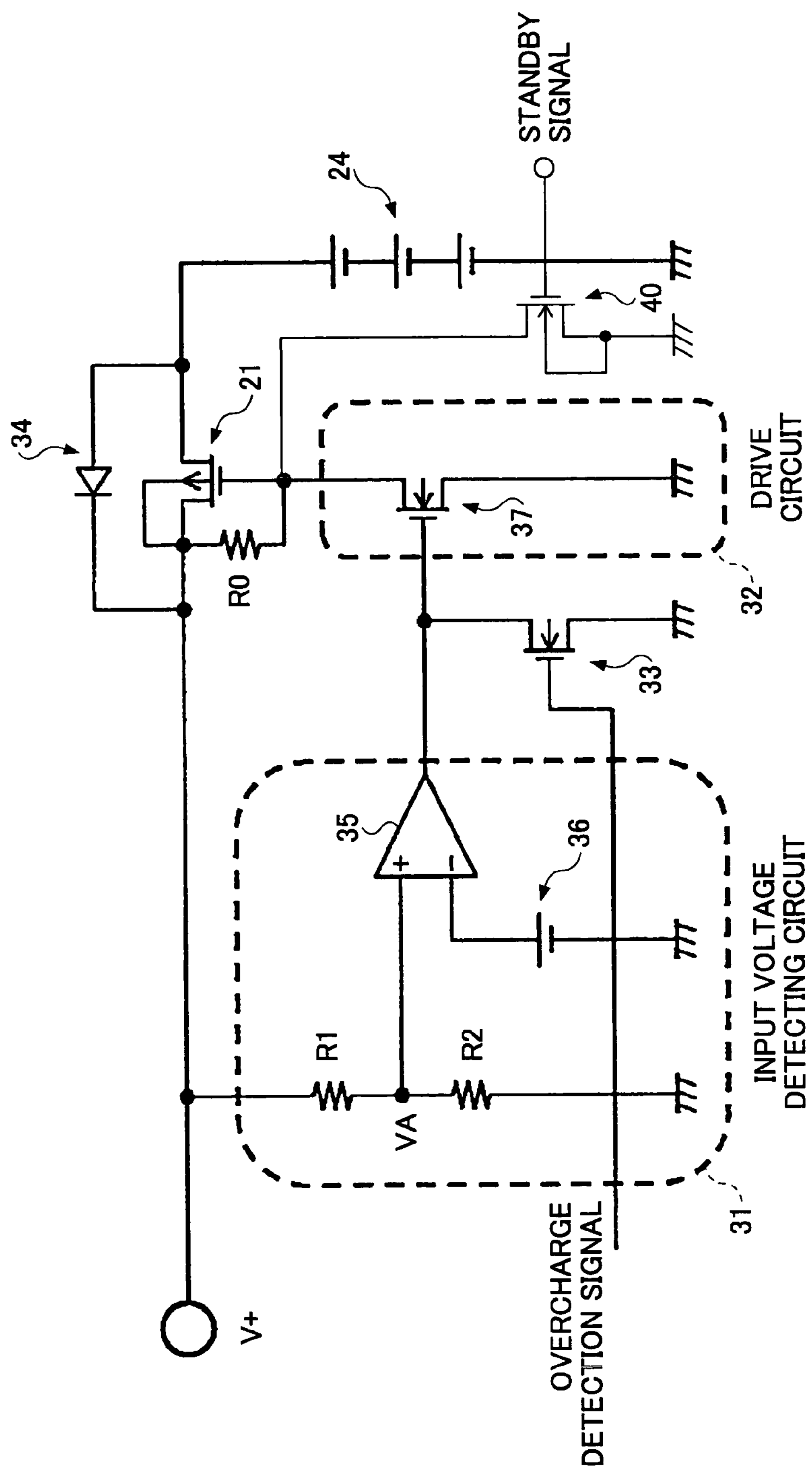
FIG. 4 is a circuit diagram showing the construction of a second embodiment of the charge control circuit according to the present invention.

FIG. 4 is a circuit diagram showing the construction of a second embodiment of the charge control circuit according to the present invention. In FIG. 4, the same elements as those of FIG. 2 are referred to by the same numerals, and a description thereof will be omitted.

A charge control circuit of FIG. 4 includes an NMOS transistor 40 in addition to the construction of the charge control circuit of FIG. 2. The NMOS transistor 40 receives a standby signal at its gate node, and couples the gate node of the PMOS transistor 21 to a ground when a standby signal is HIGH. This standby signal becomes HIGH when the load of a power supply is small in an apparatus to which the battery pack 13 is attached. If the apparatus to which the battery pack 13 is attached is a notebook personal computer, for example, the load of a power supply is small in the standby mode of the notebook personal computer since operations are suspended in most of the core electronic circuits. In this standby mode, the standby signal becomes HIGH, thereby coupling the gate node of the PMOS transistor 21 to a ground and thus making the PMOS transistor 21 fully conductive.

In the second embodiment shown in FIG. 4, the PMOS transistor 21 is fully turned on when the load of a power supply (i.e., the load of the charger 11) is small, thereby achieving a charging process with a massive current. This makes it possible to shorten a charge time.

Figure 5:
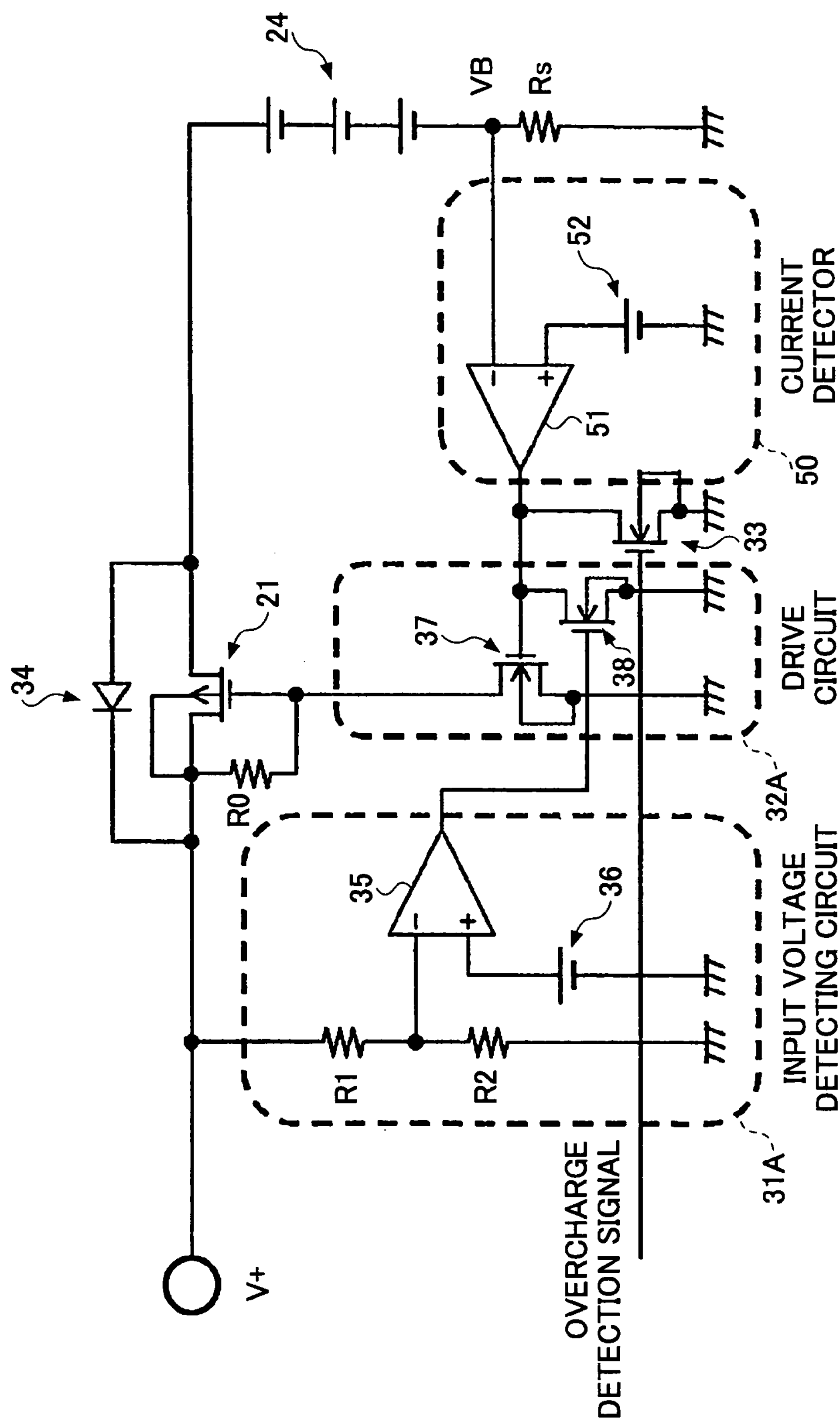
FIG. 5 is a circuit diagram showing the construction of a third embodiment of the charge control circuit according to the present invention.

FIG. 5 is a circuit diagram showing the construction of a third embodiment of the charge control circuit according to the present invention. In FIG. 5, the same elements as those of FIG. 2 are referred to by the same numerals, and a description thereof will be omitted.

A charge control circuit of FIG. 5 includes a current detecting resistor Rs and a current detector 50 in addition to the construction of the charge control circuit of FIG. 2. With the provision of the current detector 50, the drive circuit 32 is changed to a drive circuit 32A. Since the gate node of the NMOS transistor 37 of the drive circuit 32A is connected to the output of the current detector 50, the output of the amplifier 35 of an input voltage detecting circuit 31A is coupled to the gate node of the NMOS transistor 37 via an NMOS transistor 38 intervening therebetween. Due to this change, further, the inverted input terminal and non-inverted input terminal of the amplifier 35 are switched with each other.

The current detector 50 includes an amplifier 51 and a reference-voltage source 52. A voltage responsive to a current flowing through the lithium-ion battery 24 is generated as voltage VB at one end of the current detecting resistor Rs. This potential VB is supplied to an inverted input terminal of the amplifier 51. The non-inverted input terminal of the amplifier 51 receives a reference potential from the reference-voltage source 52. The amplifier 51 generates an output responsive to a difference between the potential VB and the reference potential for provision to the gate node of the NMOS transistor 37 of the drive circuit 32A. The drain node of the NMOS transistor 37 is connected to the gate node of the PMOS transistor 21. The gate node of the NMOS transistor 37 is further connected to the drain node of the NMOS transistor 38.

As a charge current increases, the voltage VB proportional to the charge current goes up, resulting in a drop in the output voltage of the amplifier 51. In response, the gate potential of the PMOS transistor 21 rises, thereby increasing the ON resistance of the PMOS transistor 21. This causes the charge current to decrease. In this manner the charge current is controlled to drop in response to an increase in the charge current, thereby settling at a predetermined current amount.

As a charge current decreases, the voltage VB proportional to the charge current goes down, resulting in a rise in the output voltage of the amplifier 51. In response, the gate potential of the PMOS transistor 21 falls, thereby decreasing the ON resistance of the PMOS transistor 21. This causes the charge current to increase. In this manner the charge current is controlled to rise in response to a drop in the charge current, thereby settling at a predetermined current amount.

In the embodiment describe above, the current detector 50 detects a charge current running through the lithium-ion battery 24, and the drive circuit 32A controls the ON resistance of the PMOS transistor 21 in response to the detected charge current. This eliminates a need for the constant-current-based control of the charger 11. Further, the input voltage detecting circuit 31A detects the input voltage V+, and the drive circuit 32A controls the ON resistance of the PMOS transistor 21 in response to the detected input voltage V+. This makes it possible to keep constant the input voltage V+ as in the first embodiment.

Figure 6:
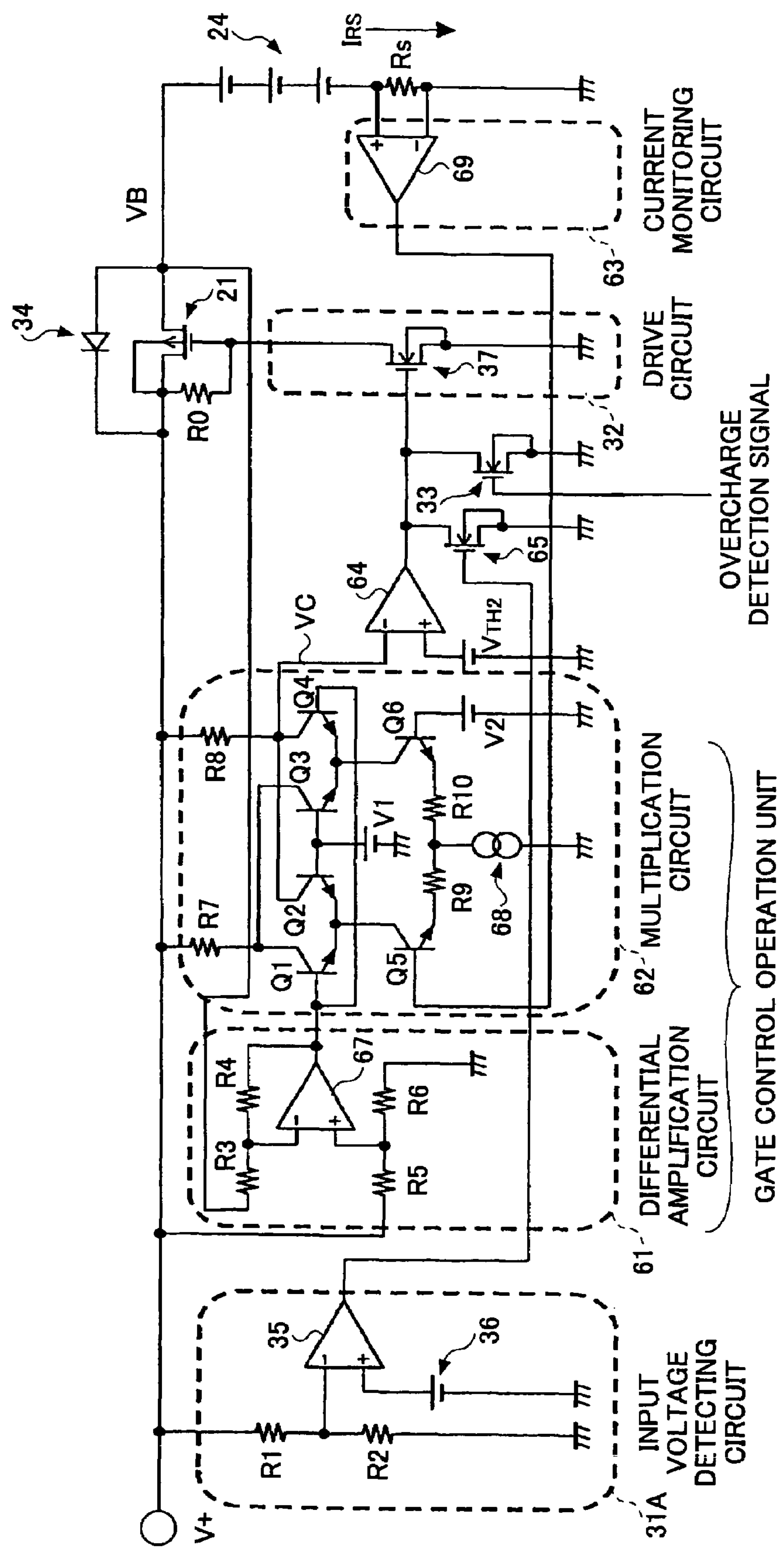
FIG. 6 is a circuit diagram showing the construction of a fourth embodiment of the charge control circuit according to the present invention.

FIG. 6 is a circuit diagram showing the construction of a fourth embodiment of the charge control circuit according to the present invention. In FIG. 6, the same elements as those of FIG. 2 are referred to by the same numerals, and a description thereof will be omitted.

A charge control circuit of FIG. 6 includes a differential amplification circuit 61, a multiplication circuit 62, a current monitoring circuit 63, an amplifier 64, an NMOS transistor 65, and a current detecting resistor Rs in addition to the construction of the charge control circuit of FIG. 2. Further, an input voltage detecting circuit 31A is provided in place of the input voltage detecting circuit 31. In the input voltage detecting circuit 31A, the inverted input terminal and non-inverted input terminal of the amplifier 35 are switched with each other compared to the amplifier 35 of the input voltage detecting circuit 31.

The differential amplification circuit 61 includes resistors R3 through R6 and an amplifier 67. The non-inverted input terminal of the amplifier 67 receives a potential that is obtained by dividing the input voltage V+ of the battery pack 13 by the resistor R5 and the resistor R6. The inverted input terminal of the amplifier 67 receives a potential responsive to the potential VB appearing at one end of the PMOS transistor 21. The potential VB is a potential appearing on the opposite side to the V+ side among the source node and drain node of the PMOS transistor 21. With this provision, the amplifier 67 outputs a potential responsive to a difference between V+ and VB, i.e., a potential responsive to a voltage drop across the PMOS transistor 21. The output of the amplifier 67 is supplied to the multiplication circuit 62.

The multiplication circuit 62 includes resistors R7 through R10, transistors Q1 through Q6, voltage sources V1 and V2, and a constant current source 68. As described above, the potential responsive to a difference between V+ and VB is input into the multiplication circuit 62 from the amplifier 67 of the differential amplification circuit 61. Further, the multiplication circuit 62 receives a potential responsive to a charge current IRS from the amplifier 69 of the current monitoring circuit 63. The amplifier 69 detects a voltage drop produced by the charge current IRS flowing through the current detecting resistor Rs. The multiplication circuit 62 obtains a product of the charge current IRS and the potential difference between V+ and VB so as to calculate electric power consumed by the PMOS transistor 21. An output VC of the multiplication circuit 62 indicative of this electric power is supplied to the inverted input terminal of the amplifier 64. The non-inverted input terminal of the amplifier 64 is connected to a reference-voltage source VTH2.

As the electric power VC consumed at the PMOS transistor 21 increases, the output of the amplifier 64 drops, resulting in a rise in the gate voltage of the PMOS transistor 21. Consequently, the ON resistance of the PMOS transistor 21 increases, thereby decreasing the charge current. As the electric power VC consumed at the PMOS transistor 21 decreases, the output of the amplifier 64 rises, resulting in a drop in the gate voltage of the PMOS transistor 21. Consequently, the ON resistance of the PMOS transistor 21 decreases, thereby increasing the charge current.

With this provision, it is possible to keep constant the electric power consumed at the PMOS transistor 21, thereby suppressing excess heat generation at the PMOS transistor 21. Further, the input voltage V+ is kept constant in the same manner as in the first embodiment shown in FIG. 2. In the fourth embodiment shown in FIG. 6, the gate node of the NMOS transistor 37 of the drive circuit 32 is connected to the output of the amplifier 64, the output of the amplifier 35 of the input voltage detecting circuit 31A is coupled to the gate node of the NMOS transistor 37 via an NMOS transistor 65 intervening therebetween. Due to this change, further, the inverted input terminal and non-inverted input terminal of the amplifier 35 are switched with each other.

Moreover, the circuit construction of the multiplication circuit 62 is illustrated as an example, and is not intended to be limiting. Any circuit construction may be used as long as it achieves a multiplication function.

Figure 7:
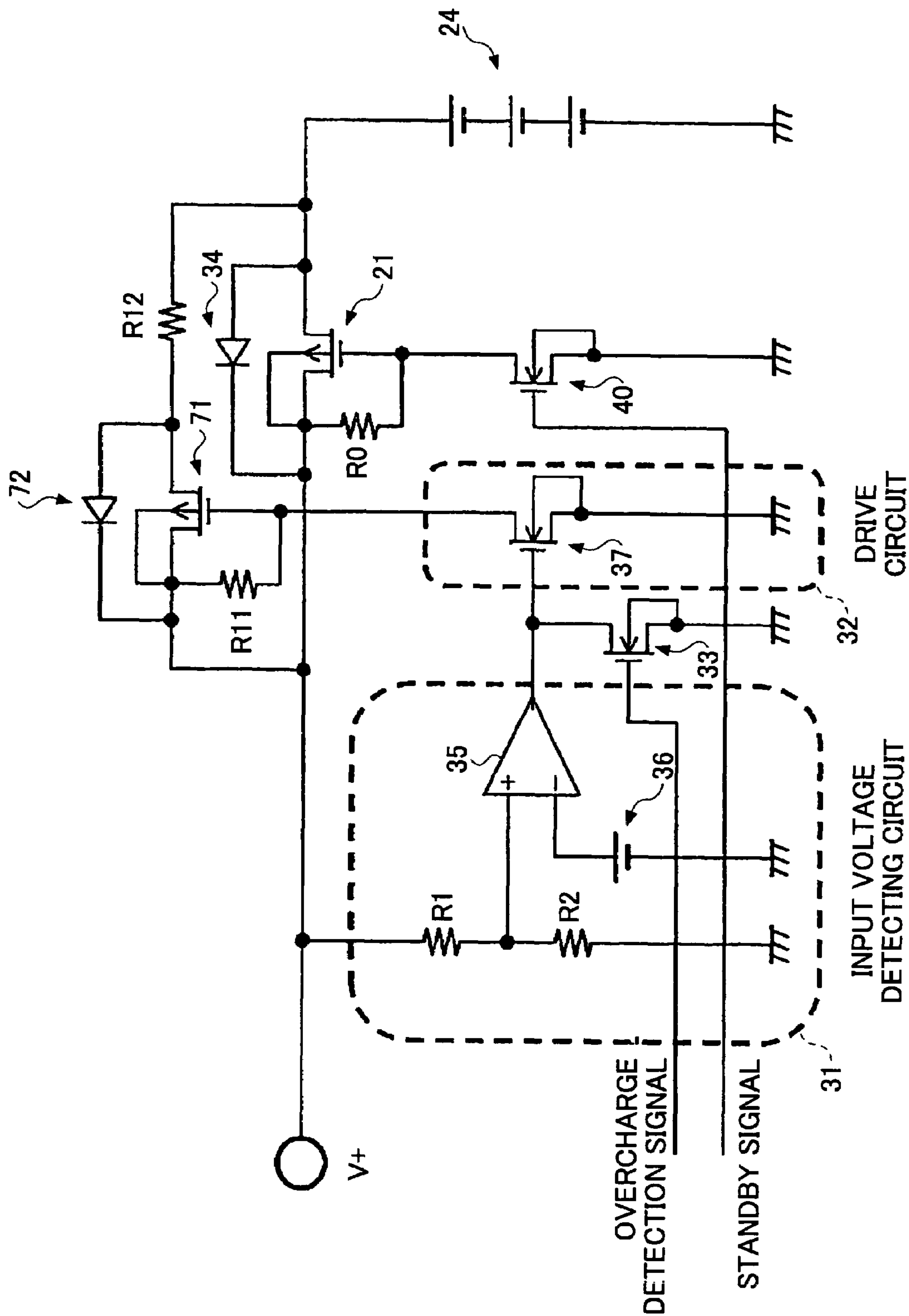
FIG. 7 is a circuit diagram showing the construction of a fifth embodiment of the charge control circuit according to the present invention.

FIG. 7 is a circuit diagram showing the construction of a fifth embodiment of the charge control circuit according to the present invention. In FIG. 7, the same elements as those of FIG. 4 are referred to by the same numerals, and a description thereof will be omitted.

In addition to the construction of the charge control circuit of FIG. 4, a charge control circuit of FIG. 7 includes a PMOS transistor 71, a parasitic diode 72, and resistors R11 and R12. Moreover, the output of the drive circuit 32 is supplied to the gate node of the PMOS transistor 71 for the precharge purpose rather than to the gate node of the PMOS transistor 21.

During a normal charging process, the PMOS transistor 21 is in a nonconductive state. In this case, the input voltage detecting circuit 31 and the drive circuit 32 control the ON resistance of the PMOS transistor 71 in such manner that the ON resistance may take any value between the conductive state and the nonconductive state, thereby charging the lithium-ion battery 24 while keeping the input voltage V+ constant. When the load of the power supply is small, i.e., when the load of the charger 11 is small (as in the cases of current-consumption saving mode), the standby signal is changed to HIGH so as to perform charging with a massive current. This shortens the charge time.

In the construction described above, the PMOS transistor 21 that can only be set to either a fully conductive state or a fully nonconductive state is provided separately from the MOS transistor 71 that can be set to any state in a range between a fully conductive state and a fully nonconductive state. This makes it possible to use an MOS transistor suitable for a desired operation. If only the PMOS transistor 21 is provided, the turning on of the PMOS transistor 21 when the voltage of the lithium-ion battery 24 is very low causes an excessive current to flow, which may destroy the PMOS transistor 21. In the construction of FIG. 7, the presence of the PMOS transistor 71 provides a function to precharge the lithium-ion battery 24 before the PMOS transistor 21 is turned on. This provides an advantage in that excessive heating of the PMOS transistor 21 is prevented. That is, the PMOS transistor 71 provides dual functions, i.e., the function to stabilize the input voltage V+ according to the invention and the function to precharge the lithium-ion battery 24.

Figure 8:
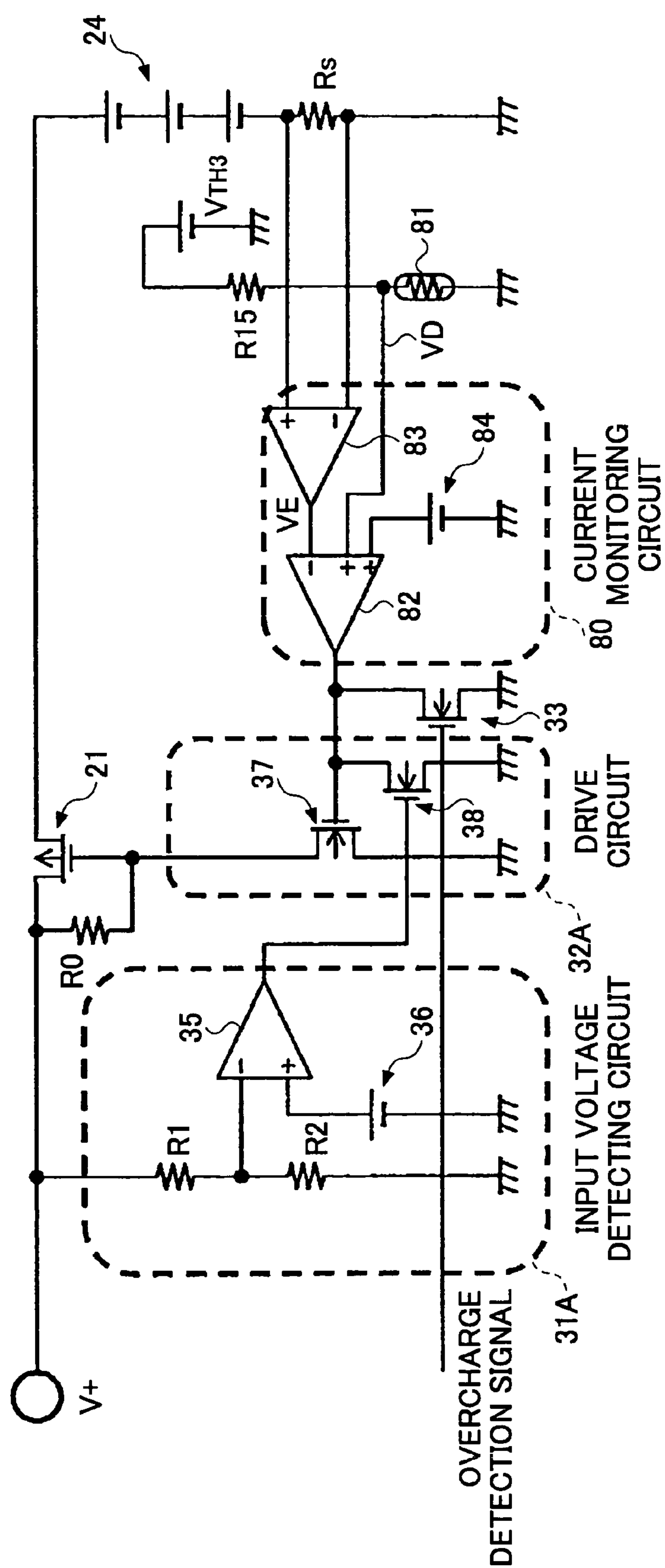
FIG. 8 is a circuit diagram showing the construction of a sixth embodiment of the charge control circuit according to the present invention.

FIG. 8 is a circuit diagram showing the construction of a sixth embodiment of the charge control circuit according to the present invention. In FIG. 8, the same elements as those of FIG. 5 are referred to by the same numerals, and a description thereof will be omitted.

In a charge control circuit of FIG. 8, a current monitoring circuit 80 is provided in place of the current detector 50, compared with the construction of the charge control circuit of FIG. 5. The current monitoring circuit 80 receives voltages appearing at opposite ends of the current detecting resistor Rs and a voltage VD appearing at one end of a thermistor 81. The thermistor 81 and a resistor R15 are connected in series, and are situated between a voltage VTH3 and a ground potential. The thermistor 81 has such characteristics that its resistance decreases at high temperature, and increases at low temperature. As the PMOS transistor 21 generates heat by consuming electric power, the resistance of the thermistor 81 changes, causing a change in the voltage VD.

The current monitoring circuit 80 includes amplifiers 82 and 83 and a reference-voltage source 84. The amplifier 83 detects a voltage drop produced by the charge current flowing through the current detecting resistor Rs, and supplies a potential VE responsive to the amount of the charge current to the inversed input terminal of the amplifier 82. A first non-inverted input terminal of the amplifier 82 receives a reference voltage from the reference-voltage source 84, and a second non-inverted input terminal receives the potential VD responsive to the resistance of the thermistor 81. Among the two non-inverted inputs of the amplifier 82, one having a lower potential is given priority for comparison with VE. That is, VD is compared with VE if VD is smaller than the reference potential, and the reference potential is compared with VE if the reference potential is smaller than VD.

At low temperature the resistance of the thermistor 81 is large, so that the potential VD is higher than the reference potential. In this case, VE is compared with the reference potential, resulting in the same operation as in the case of the construction shown in FIG. 5. The charge current can thus be kept constant. Also, control by the input voltage detecting circuit 31A and the drive circuit 32A keeps the input voltage V+ constant.

As the PMOS transistor 21 generates heat and becomes high temperature, the resistance of the thermistor 81 drops, resulting in the potential VD being lower than the reference potential. In this case, VE is compared with VD. As VD becomes lower than VE due to a temperature rise, the output of the amplifier 82 drops, which increases the gate voltage of the PMOS transistor 21. Consequently, the ON resistance of the PMOS transistor 21 becomes large, with a resultant decrease in the charge current. Conversely, as VD becomes higher than VE due to a temperature drop, the output of the amplifier 82 rises, which decreases the gate voltage of the PMOS transistor 21. Consequently, the ON resistance of the PMOS transistor 21 becomes small, with a resultant increase in the charge current. In this manner, the charge current is decreased in response to a temperature rise, and is increased in response to a temperature drop. This makes it possible to ensure a sufficient charge current while keeping the heat generation of the PMOS transistor 21 below a predetermined temperature.

Further, the present invention is not limited to these embodiments, but various variations and modifications may be made without departing from the scope of the present invention.

What is claimed is:

1. A circuit for controlling charging, which is configured to be coupled to a charger for performing charging with a constant current, comprising:

a transistor provided on a charging path between a position of a charging terminal for receiving the constant current from the charger and a position of a battery;

an input voltage detecting circuit configured to detect a potential of a point between the charging terminal and the transistor on the charging path; and a drive circuit configured to control an ON resistance of said transistor continuously between a fully conductive state and a fully nonconductive state in response to the potential detected by said input voltage detecting circuit between the charging terminal and the transistor so as to set the ON resistance of the transistor to any desired value between the fully conductive state and the fully nonconductive state, wherein the drive circuit controls the ON resistance of the transistor continuously to stabilize an input voltage of the charging terminal to a predetermined voltage.

2. The circuit as claimed in claim 1, wherein said drive circuit makes said transistor substantially fully nonconductive in response to a detection of overcharging.

3. The circuit as claimed in claim 1, further comprising a circuit configured to make said transistor substantially fully conductive in response to a signal supplied from an exterior.

4. The circuit as claimed in claim 1, further comprising a current detector configured to detect a charge current flowing through the charging path, wherein said drive circuit controls the ON resistance of said transistor in response to the charge current detected by said current detector.

5. The circuit as claimed in claim 1, further comprising:

a first circuit configured to detect a voltage drop across said transistor;

a second circuit configured to detect a charge current flowing through the charging path; and a third circuit configured to obtain a product of the voltage drop detected by said first circuit and the charge current detected by said second circuit, wherein said drive circuit controls the ON resistance of said transistor in response to the product obtained by said third circuit.

6. The circuit as claimed in claim 1, further comprising:

another transistor situated on the charging path in parallel with said transistor; and a circuit configured to make said another transistor substantially fully conductive in response to a signal supplied from an exterior.

7. The circuit as claimed in claim 1, further comprising:

a temperature detecting device; and a temperature detecting circuit, wherein said drive circuit controls the ON resistance of said transistor in response to an output of said temperature detecting circuit.

8. The circuit as claimed in claim 1, implemented as a semiconductor device.

9. The circuit as claimed in claim 1, wherein said drive circuit controls the ON resistance of said transistor as a continuous resistance value.

10. A battery pack, comprising:

a charge control circuit configured to be coupled to a charger for performing charging with a constant current; and a battery configured to be charged through a charging path, wherein said charge control circuit includes:

a transistor provided on the charging path between a position of a charging terminal for receiving the constant current from the charger and a position of said battery;

an input voltage detecting circuit configured to detect a potential of a point between the charging terminal and the transistor on the charging path; and a drive circuit configured to control an ON resistance of said transistor continuously between a fully conductive state and a fully nonconductive state in response to the potential detected by said input voltage detecting circuit between the charging terminal and the transistor so as to set the ON resistance of the transistor to any desired value between the fully conductive state and the fully nonconductive state, wherein the drive circuit controls the ON resistance of the transistor continuously to stabilize an input voltage of the charging terminal to a predetermined voltage.

11. An electronic apparatus, comprising:

a battery pack including a charge control circuit and a battery configured to be charged through a charging path;

a charger configured to perform charging with a constant current and having an input terminal receiving a direct-current voltage and an output terminal coupled to said battery pack, and configured to step down the direct-current voltage received at the input terminal for output to the output terminal;

a DC-DC converter coupled to the output terminal of said charger; and an electronic circuit coupled to an output of said DC-DC converter, wherein said charge control circuit includes:

a transistor provided on the charging path between a position of a charging terminal for receiving the constant current from the charger and a position of said battery;

an input voltage detecting circuit configured to detect a potential of a point between the charging terminal and the transistor on the charging path; and a drive circuit configured to control an ON resistance of said transistor continuously between a fully conductive state and a fully nonconductive state in response to the potential detected by said input voltage detecting circuit between the charging terminal and the transistor so as to set the ON resistance of the transistor to any desired value between the fully conductive state and the fully nonconductive state, wherein the drive circuit controls the ON resistance of the transistor continuously to stabilize an input voltage of the charging terminal to a predetermined voltage.

12. The electronic apparatus as claimed in claim 11, wherein said charge control circuit further includes a circuit configured to make said transistor substantially fully conductive in response to a signal indicative of a standby mode of said electronic circuit.

13. A method of controlling charging by a charge control circuit configured to be coupled to a charger for performing charging with a constant current, comprising the steps of:

detecting a potential at a first position on a charging path receiving the constant current from the charger for charging a battery; and controlling an ON resistance of a transistor continuously between a fully conductive state and a fully nonconductive state so as to set the ON resistance of the transistor to any desired value between the fully conductive state and the fully nonconductive state, said transistor being situated on the charging path at a second position between the battery and the first position, wherein the step of controlling the ON resistance of the transistor controls the ON resistance of the transistor to stabilize the detected potential to a predetermined voltage.

14. The method as claimed in claim 13, wherein said step of controlling the ON resistance controls the ON resistance of said transistor as a continuous resistance value.

15. A circuit for controlling charging, which is configured to be coupled to a charger for performing charging with a constant current, comprising:

an input voltage detecting circuit configured to detect a potential of a charging terminal for receiving the constant current from the charger on a charging path for charging a battery; and a drive circuit configured to keep the potential of the charging terminal substantially constant in response to the detected potential by controlling an ON resistance of a transistor continuously between a fully conductive state and a fully nonconductive state so as to set the ON resistance of the transistor to any desired value between the fully conductive state and the fully nonconductive state, said transistor being situated on the charging path at a position between the battery and the charging terminal, wherein the drive circuit controls the ON resistance of the transistor continuously to stabilize the detected potential of the charging terminal to a predetermined voltage.

16. A circuit for controlling charging, which is configured to be coupled to a charger for performing charging with a constant current, comprising:

an input voltage detecting circuit configured to detect a potential of a charging terminal for receiving the constant current from the charger on a charging path for charging a battery; and a drive circuit configured to prevent the potential of the charging terminal from clamping to a potential of the battery in response to the detected potential by controlling an ON resistance of a transistor continuously between a fully conductive state and a fully nonconductive state so as to set the ON resistance of the transistor to any desired value between the fully conductive state and the fully nonconductive state, said transistor being situated on the charging path at a position between the battery and the charging terminal, wherein the drive circuit controls the ON resistance of the transistor continuously to stabilize the detected potential of the charging terminal to a predetermined voltage.

17. A method of controlling charging by a charge control circuit configured to be coupled to a charger for performing charging with a constant current, comprising:

detecting a potential of a charging terminal for receiving the constant current from the charger on a charging path for charging a battery; and stabilizing the detected potential of the charging terminal substantially constant in response to the detected potential by controlling an ON resistance of a transistor continuously between a fully conductive state and a fully nonconductive state so as to set the ON resistance of the transistor to any desired value between the fully conductive state and the fully nonconductive state, said transistor being situated on the charging path at a position between the battery and the charging terminal.

18. A method of controlling charging by a charge control circuit configured to be coupled to a charger for performing charging with a constant current, comprising:

detecting a potential of a charging terminal for receiving the constant current from the charger on a charging path for charging a battery; and preventing the potential of the charging terminal from clamping to a potential of the battery in response to the detected potential by controlling an ON resistance of a transistor continuously between a fully conductive state and a fully nonconductive state so as to set the ON resistance of the transistor to any desired value between the fully conductive state and the fully nonconductive state, said transistor being situated on the charging path at a position between the battery and the charging terminal, wherein the ON resistance of the transistor is controlled to stabilize the detected potential of the charging terminal to a predetermined voltage.

* * * * *